Figure 1:
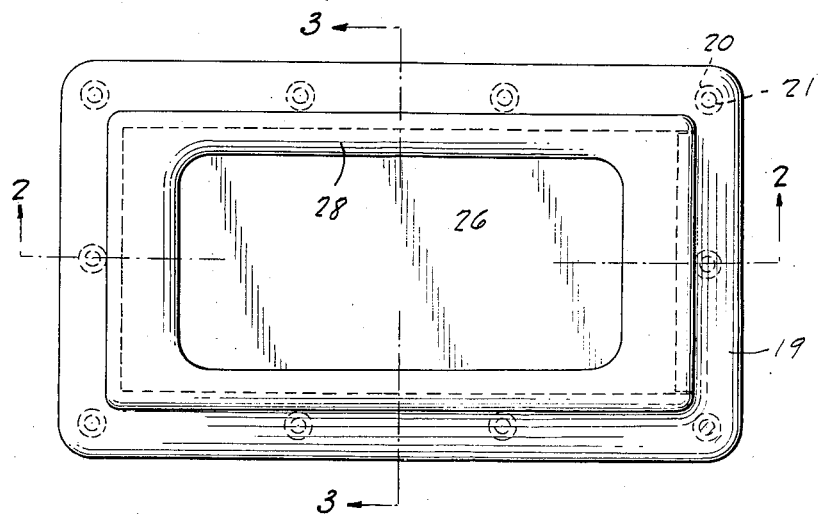

Jan. 9, 1940.  F. M. BOWERS  2,186,817

FILTER GLASS HOLDER

Filed March 16, 1938

INVENTOR.
FREDERICK M. BOWERS
BY Joshua R H Potts
ATTORNEY.

Patented Jan. 9, 1940

2,186,817

UNITED STATES PATENT OFFICE 2,186,817

FILTER GLASS HOLDER

Frederick M. Bowers, Chester, Pa.

Application March 16, 1938, Serial No. 196,128

11 Claims. (Cl. 2—8)

This invention has to do with filter glass holders such as are commonly employed in conjunction with welding shields or helmets for the purpose of maintaining the filter glass, together with associated protective glass plates, in position.

The invention has in view, as its foremost objective, the provision of a filter glass holder which is made from a yieldable, compressible, elastic material, such as rubber, and the properties of which material are peculiarly adapted to the carrying out of certain operations which are inherently present in connection with the use of a filter glass holder.

From the very nature of the use to which the filter glass holders are put it is essential that provision be made for attaching the same to a welding shield or helmet. Accordingly, an important object of the invention is the provision of a filter glass holder of the character above noted, which is provided with compressible and expansible means for attaching the holder to a welding shield.

More in detail the invention contemplates an arrangement wherein the holder is provided with fastening elements that are formed integrally with the holder, and which are adapted to be inserted in openings in a welding helmet. An important phase of the invention is the particular formation of these fastening elements.

Ordinarily these filter glass holders are designed to receive and maintain in effective position a filter glass, and it is now conventional practice in this art to position a protective glass on each side of the filter glass, so as to protect the latter from flying particles of metal. As one of the protective glasses is damaged by the flying particles of metal and oxide it becomes necessary, from time to time, to replace the damaged protective glass. Thus it is important that these filter glass holders be so designed as to readily accommodate positioning and removal of the glass plate elements.

Accordingly, the invention has in view, as a further objective, the provision of a rubber filter glass holder of the character above noted, in which the side wall is formed with means for the insertion of the glass plate elements. A further particular object of the invention is the provision of a slit which ordinarily will maintain the glass plates assembled within the holder.

The invention has in view the provision of a slit, the edges of which are normally in engagement, but which may be deformed out of engagement to permit the passageway of the glass plates. After the glass plates have passed therethrough the edges of the slit, due to the elasticity of the rubber, will resume their normal position.

The invention has in view, as a further object, an alternative arrangement in which a slot having spaced edges is formed in a side wall of the filter glass holder. A flap is moulded integrally with the holder, and when in its normal position will close the slot. However, the flap may be folded back to accommodate the passage of glass plates through the slot.

It is also conventional practice in this art to employ a leaf spring element as a means for maintaining the glass plates yieldably in position in the holder, such spring elements being designed to press against the body of the shield or helmet and the glass plate elements to spread the latter from the former, and the invention has in view, as a further object, the provision of a filter glass holder of the character above noted which peculiarly adapts itself to the positioning of the spring with a firm support therefor in the shield or mask.

Yet another object of the invention is the provision of a welding shield or helmet which is peculiarly designed to have a filter glass holder of the character above described attached thereto. In carrying out this objective, the shield or helmet, which is of a fibrous material which may be readily formed, has a flat surface pressed from the usual curved front wall of the shield or helmet. The usual window opening is cut in this flat surface, leaving a flat marginal flange to which the filter glass holder is attached, and a further detailed object is the provision of a filter glass holder of the character above noted which is formed with a flap that overlies the outer peripheral edge of this flat flange, and which flap affords a required seal against light leaks which might escape through the joinder of the holder to the shield or helmet.

Various other more detailed objects and advantages such as arise in carrying out the above noted thoughts in a practical embodiment will in part become apparent and in part be hereinafter stated, as the description of the invention proceeds.

The invention, therefore, comprises a filter glass holder that is made from a yieldable, compressible and elastic material such as rubber, and which has integrally formed therewith a plurality of fastening elements designed for cooperation with openings formed on a flat flange that is pressed from a welding shield or helmet. The holder is also provided with a slit or slot through which glass plates may be inserted to position them in or remove the same from the filter glass holder, and the slot or slit is so designed as to maintain the glass plates in position within the holder. The holder is also formed with a flap that is intended to surround the flat flange formed in the shield or helmet to provide a seal against light leaking through the joinder of the holder to the shield or helmet.

Figure 2:
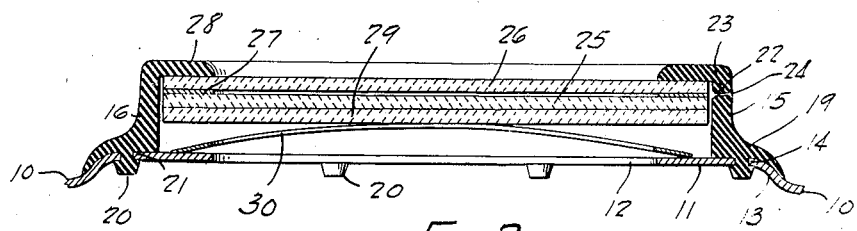
Figure 3:
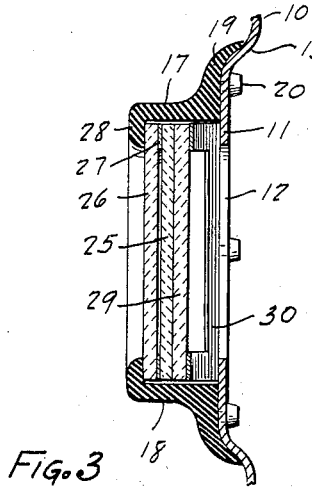
Figure 4:
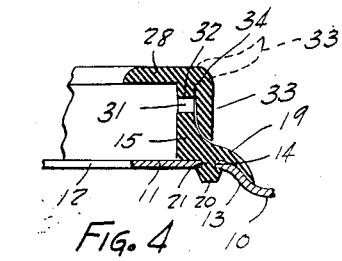

For a full and more complete understanding of the invention reference may be had to the following description and accompanying drawing, wherein Figure 1 is a front elevational showing of a filter glass holder made in accordance with the precepts of this invention, Figure 2 is a sectional showing taken about on the plane represented by the line 2—2 of Figure 1, bringing in a portion of a welding shield or helmet to which the holder is attached, Figure 3 is a sectional showing taken at right angles to the showing of Figure 2, this view being taken about on the plane represented by the line 3—3 of Figure 1, and Figure 4 is a detailed showing of a modified form bringing in the slot which is closed by a flap.

Referring now to the drawing, wherein like reference characters denote corresponding parts, it is noted that the filter glass holder of this invention is made from a material having the required properties of compressibility and elasticity, the invention having particularly in view a rubber composition which may be moulded into the required structural formation in accordance with methods well-known to those skilled in the rubber art.

As shown in the drawing, a portion of a welding shield or helmet is represented at 10, and is shown as having a flat face 11 pressed therefrom, and which face 11 is formed with a window opening 12. Thus the window opening 12 is defined by a flat flange extending entirely thereabout, and which flange blends in with the curved front wall of the shield or helmet by rounded shoulders 13. The welding shield or helmet 10 is preferably made from a fibrous material which is susceptible of being formed and pressed into the required form. Adjacent to the shoulder 13, on each side, the flange 11 is provided with a plurality of spaced openings 14.

A filter glass holder is shown as formed from a single piece of rubber composition which is molded into the required shape, and includes side walls designated 15 and 16, a top wall 17 and a bottom wall 18. Integrally connected to the walls 15, 16, 17 and 18, at their lower edges thereof, are flap structures 19 which are substantially the same shape, and which overlie the shoulders 13, as clearly shown in Figures 2, 3 and 4.

The underside of these flaps 19 have integrally formed therewith fastening elements which take the form of heads 20 that are connected by narrow necks 21 with the respective flap portions. These fastening elements 20 correspond in number and relative spaced positions to the openings 14, with the heads 20 functioning much in the manner of rivet heads when the holder is assembled on the shield 10.

In assembling the holder in position on the shield or helmet a blunt instrument may be availed of to force the heads 20 through the openings 14, the latter having a dimension which provides for the loose fit of the openings 14 about the necks 21. Thus the heads 20 will be compressed as they are forced through the openings. However, due to the compressible nature of the rubber, this will be permitted, and after being forced through the openings 14 the elastic property of the rubber will cause the heads 20 to resume the normal positions illustrated, in which they function as fastening elements.

While any of the walls 15, 16, 17, or 18 may be formed with an appropriate slot or slit for inserting the several glass elements that are positioned within the holder, in the form of the invention illustrated in the drawing, the wall 15 is shown as formed with a slit 22, and which slit is characterized by the engaging edges 23 that have an engaging surface appreciably less than the thickness of the wall 15, this arrangement being provided by the beveled edges 24 which are formed on both faces of the wall 15 at the slit 22.

A filter glass is represented at 25, such filter glasses being well-known in this art. As shown in Figures 2 and 3, a plate of protective glass 26 is shown as interposed between a gasket 27 that engages the filter glass 25 and front flanges 28 that are integrally formed at the outer edges of each of the walls 15, 16, 17 and 18. Also, a rear protective glass may be employed, as represented at 29, and a leaf spring of bow formation is shown at 30 as engaging the plate 29 to urge the entire plate assembly into a closely assembled position with the plate 26 engaging the flanges 28. It is notable that at the outer edge the extremities of the spring 30 engage the hard surface afforded by the face 11, to insure of a proper backing for the spring.

The plates 25, 27 and 29, and gasket 27 may be inserted individually through the slit 22, and during the inserting operations the side wall 15 will be deformed to spread the edges 23 sufficiently far to permit of the insertion. However, after the plates are positioned within the holder, and the deforming force removed from the wall 15, the latter will resume its former state, in which the edges 23 of the slit 22 are in contacting engagement, thus preventing accidental removal of the plates from the holder.

Figure 4 develops a slight modification in which the slit 22 in the wall 15 is replaced by a slot designated 31. This slot has spaced edges 32 which are spaced sufficiently far apart to permit of the insertion of any one of the plate elements 25, 26, 29 or gasket 27 therethrough, without entailing any appreciable deforming of the wall 15.

A flap 33 is integrally connected, as shown at 34, with the top edge of the wall 15 and front flange 28 connected thereto. When in its normal position this flap 33 constitutes a closure for the slot 31. However, when a glass plate is to be passed therethrough, the flap may be bent into the dotted line position shown in Figure 4 by deforming the joinder portion 34, to permit of the glass plate passing through this slot. After the glass plate has been passed through and the deforming force is removed from the flap 33, due to the elasticity of the rubber, it will resume the normal closing position illustrated.

When the slot 31 is formed in the wall 15, as shown in Figure 4, the slot will be formed by being cast or molded in the rubber. This is to be contrasted to the arrangement shown in Figure 2, in which the wall 15 is molded with the depressions that later constitute the bevels 24 when the slit 22 is cut out.

While preferred specific embodiments of the invention are hereinbefore set forth it is to be clearly understood that I am not to be limited to the exact constructions illustrated and described, because various modifications of these details may be provided in putting the invention into practice within the purview of the appended claims.

I claim:

1. The combination with a welding shield or helmet having a surface formed with a window opening and an anchoring opening, of a filter glass holder formed from a compressible and elastic material, and which holder has a fastening element integrally formed therewith which may be deformed to permit the same to pass through the said anchoring opening, and which assumes a fastening or retaining position after it has passed through the opening.

2. The combination with a welding shield or helmet having a window opening and an anchoring opening formed therein, of a filter glass holder made from a compressible and elastic material, and which holder has integrally formed therewith a fastening element comprising a neck, and an enlarged head on the neck spaced from the holder, said neck being received in the said anchoring opening with the enlarged head engaging the shield or helmet to maintain the holder assembled therewith.

3. The combination with a welding shield or helmet formed with a window opening, and a small opening adjacent thereto, of a rubber filter holder having a headed fastening element integrally formed therewith and positioned in the small opening to maintain the holder assembled on the shield or helmet.

4. The combination with a welding shield or helmet having a window opening defined by a flat marginal flange, said marginal flange being formed with a plurality of spaced openings, of a rubber filter glass holder having a plurality of fastening elements integrally formed therewith and positioned in said openings to maintain the holder assembled with the shield or helmet.

5. The combination with a welding shield or helmet having a window opening defined by a flat marginal flange, said marginal flange being formed with a plurality of spaced openings, and a rubber filter glass holder having fastening elements integrally formed therewith corresponding to the openings in the marginal flange, each of said fastening elements being defined by an enlarged head that is spaced from the holder by a neck, said connections being positioned in the said openings in the said marginal flange with the heads engaging the marginal flange to maintain the holder assembled therewith.

6. The combination with a welding shield or helmet having a window opening defined by a flat marginal flange which blends in with the shield or helmet by shoulders, of a rubber filter glass holder connected to the said marginal flange and formed with flaps overlying said shoulders.

7. The combination with a welding shield or helmet having a curved wall which is provided with a flat surface in which is cut a window opening to define a marginal flange, said flat surface being connected to the curved surface of the shield or helmet by shoulders, and a rubber filter glass holder having integral means for connecting the same to said marginal flange and having flaps overlying said shoulders.

8. A filter glass holder formed from a compressible elastic material and having a side wall formed with a slit, the side faces of which are normally in engagement to close the slit, said side wall being deformable to cause the faces of said slit to disengage whereby a glass plate is adapted to pass therethrough.

9. A filter glass holder formed from a compressible elastic material and having a side wall formed with a slit, the side faces of said slit being normally in engagement to close the slit, the edges of said faces being beveled, and add said side wall being deformable to cause the side faces of the slit to disengage to permit the passage of a glass plate through the said slit 10. A rubber filter glass holder including a side wall formed with a slot having spaced edges, and a flap constituting a closure for said slot and integrally connected to said holder.

11. A rubber filter glass holder including side walls and a top and bottom wall, bottom flanges outstanding from the edges of said walls, and a front flange extending inwardly from said walls, one of said side walls being formed with means for having a filter glass pass therethrough, while said bottom flanges have a plurality of spaced fastening elements integrally formed thereon.

FREDERICK M. BOWERS.